(12) United States Patent
Hong et al.

(10) Patent No.: US 6,185,991 B1
(45) Date of Patent: Feb. 13, 2001

(54) METHOD AND APPARATUS FOR MEASURING MECHANICAL AND ELECTRICAL CHARACTERISTICS OF A SURFACE USING ELECTROSTATIC FORCE MODULATION MICROSCOPY WHICH OPERATES IN CONTACT MODE

(75) Inventors: Jaewan Hong; Sang-il Park; Zheong-Gu Khim, all of Seoul (KR)

(73) Assignee: PSIA Corporation, Seoul (KR)

( * ) Notice: Under 35 U.S.C. 154(b), the term of this patent shall be extended for 0 days.

(21) Appl. No.: 09/024,829

(22) Filed: Feb. 17, 1998

(51) Int. Cl.$^7$ ...................................................... G01B 7/34
(52) U.S. Cl. .............................. 73/105; 250/306; 250/307
(58) Field of Search ............................... 73/105; 250/306, 250/307

(56) References Cited

U.S. PATENT DOCUMENTS

| | | | |
|---|---|---|---|
| 4,941,753 | * 7/1990 | Wickramasinghe | ............ 250/306 X |
| 5,431,055 | * 7/1995 | Takata et al. | ..................... 250/307 X |
| 5,440,121 | * 8/1995 | Yasutake et al. | ..................... 250/306 |
| 5,481,529 | 1/1996 | Takimoto et al. | . |
| 5,504,338 | 4/1996 | Marrian et al. | ..................... 250/306 |
| 5,543,614 | 8/1996 | Miyamoto et al. | . |
| 5,546,374 | * 8/1996 | Kuroda et al. | ..................... 250/306 X |
| 5,631,410 | 5/1997 | Kitamura | . |
| 5,666,190 | 9/1997 | Quate et al. | . |
| 5,689,063 | 11/1997 | Fujiu et al. | . |
| 5,698,798 | 12/1997 | Kohno et al. | ....................... 73/866.5 |
| 5,713,667 | 2/1998 | Alvis et al. | . |
| 5,742,172 | 4/1998 | Yasutake | . |
| 5,742,377 | 4/1998 | Minne et al. | . |

OTHER PUBLICATIONS

Guthner, etc., "Local poling of ferroelectric polymers by scanning force microscopy", Appl. Phys. Lett. Aug. 1992, pp. 1137–1139.

P. Maivaldt, etc., "Using force modulation to image surface elasticities with the atomic force microscope", Feb. 20, 1991, IOP Publishing Ltd., pp. 103–106.

Yves Martin, etc., "High-resolution capacitance measurement and potentiometry by force microscopy", Appl. Phys. Lett. Mar. 28, 1988, pp. 1103–1105.

J. E. Stern, etc., "Deposition and imaging of localized charge on insulator surfaces using a force microscope", Appl. Phys. Lett., Dec. 26, 1988, pp. 2717–2719.

J. M. R. Weaver, etc., "High resolution atomic force microscopy potentiometry", J. Vac. Sci. Technol. B. vol. 9, No. 3, May/Jun. 1991, pp. 1559–1561.

C. C. Williams, et al., "Lateral dopant profiling with 200 nm resoluation by scanning capacitance microscopy", Appl. Phys. Lett., vol. 55, No. 16, Oct. 16, 1989, pp. 1662–1664.

* cited by examiner

Primary Examiner—Daniel S. Larkin
(74) Attorney, Agent, or Firm—Skjerven, Morrill, MacPherson, Franklin & Friel; David E. Steuber; Omkar K. Suryadevara

(57) ABSTRACT

A microscope uses electrostatic force modulation microscopy to measure mechanical and electrical characteristics of a sample. A tip contacts the sample while a voltage (which may have dc and ac components) is applied between the tip and sample. The tip oscillates even though the tip is contacting the sample due to strong electrostatic force interaction between the tip and sample. Different characteristics of the sample such as hardness, surface potential, capacitance, surface charge, and so forth, are measured by manipulating the oscillation of the tip relative to the sample and monitoring the position of the tip.

52 Claims, 8 Drawing Sheets

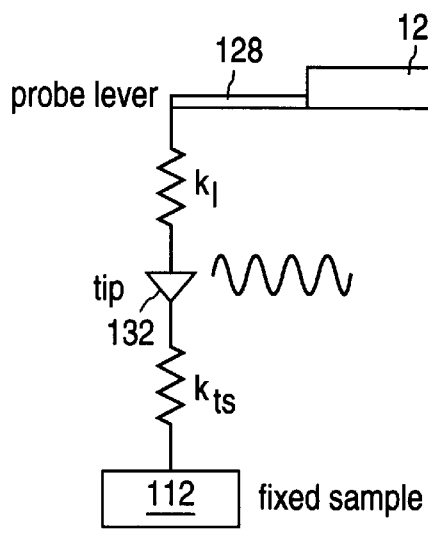
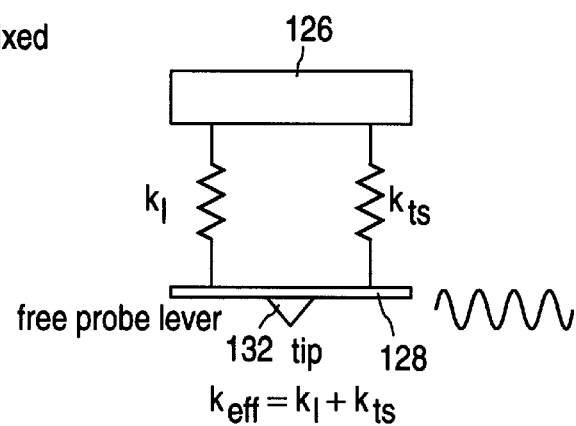
FIGURE 4a  FIGURE 4b
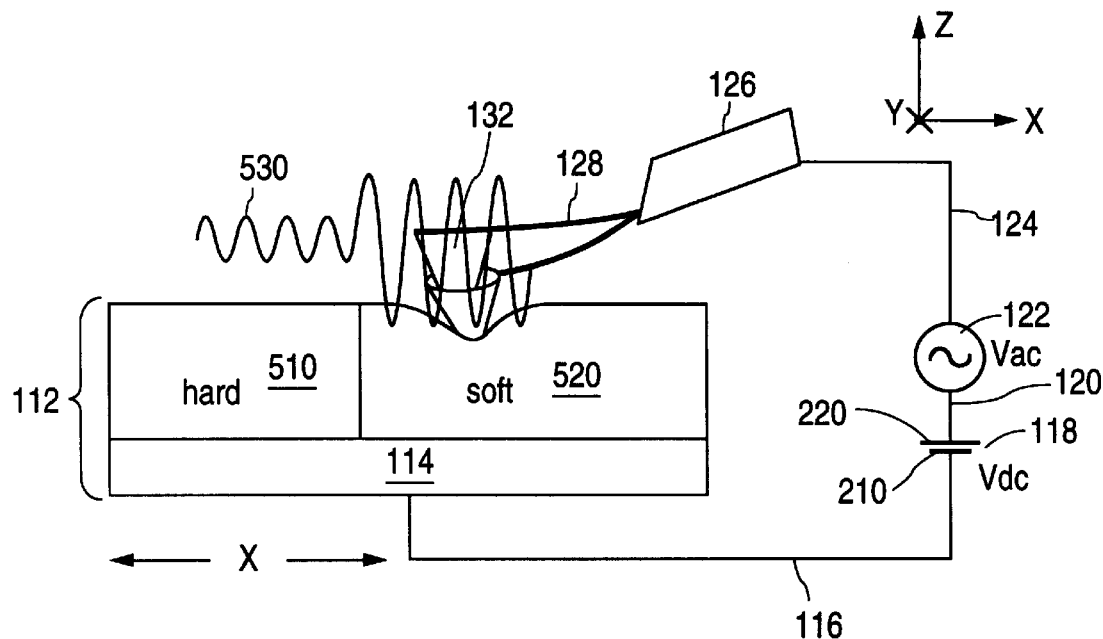
FIGURE 5

METHOD AND APPARATUS FOR MEASURING MECHANICAL AND ELECTRICAL CHARACTERISTICS OF A SURFACE USING ELECTROSTATIC FORCE MODULATION MICROSCOPY WHICH OPERATES IN CONTACT MODE

FIELD OF THE INVENTION

The invention relates to the measurement of the local properties of a sample surface, and specifically, to the measurement of the mechanical and electrical characteristics of a surface using electrostatic force modulation microscopy which operates in contact mode.

BACKGROUND OF THE INVENTION

The atomic force microscope (AFM) has matured and developed into an instrument for the routine inspection of the surface topography of both insulating and conducting samples at an atomic resolution. Recent efforts have revealed a much broader potential for the measurement of local mechanical and electrical surface properties such as the hardness, surface potential, surface charge, and capacitance of a sample.

Force modulation microscopy (FMM), in which a probe tip or sample is mechanically modulated in contact mode, typically by a piezoelectric transducer, has been used to measure the local mechanical elasticity of a surface. Electrostatic force microscopy (EFM), which operates in noncontact mode, has been developed to investigate the electrical properties of a sample such as the dielectric constant, surface charge, and surface potential. Scanning capacitance microscopy (SCM) has been used to measure the dopant profile on a semiconductor surface.

Unfortunately, the earlier FMM techniques using mechanical modulation measure only the mechanical properties of the sample, such as hardness and viscosity. Furthermore, the mechanical modulation excites other normal modes of the microscope system, which not only causes uncertainty and noise in the measurement but also limits the maximum modulation frequency to a level below the resonant frequency of the mechanical transducer and supporting structure.

Conventional EFM is implemented in a noncontact mode AFM, where the force gradient (which includes the electrostatic force gradient as well as the van der Waals force gradient) is used to control the tip-sample distance. Therefore, the probe of the conventional EFM fails to follow the true topography of a sample where a large electrostatic force gradient is present. For example, abrupt changes in the surface potential or surface charge on the sample surface produce large electrostatic force gradients. In such cases, the AFM probe does not follow the true topography but follows the constant force gradient contour.

Such errors in following topography cause successive errors in measuring the electrical properties of the sample. In addition, noncontact mode operation is complicated and its spatial resolution is significantly lower than in contact mode operation since the tip is separated, approximately 10 nm, from the sample.

Therefore, what is desired is a system and method which (1) performs both mechanical and electrical measurements, (2) does not require the probe tip or sample to be mechanically modulated, and (3) operates in contact mode.

SUMMARY OF THE INVENTION

The present invention provides a new measurement technique called "electrostatic force modulation microscopy" ("EFMM"), which measures the mechanical and electrical properties of insulating, semiconducting, and conducting samples with a more precise spatial resolution than that provided by conventional microscopy. In one embodiment, spatial resolution is provided on the order of nanometers.

In accordance with the invention, a sample is provided in an AFM in which the probe tip is maintained in contact with the sample and a voltage having an ac component is applied between the tip and the sample. In one embodiment, the applied voltage also has a dc component.

The present invention also provides an improved structure that implements EFMM. In accordance with the invention, a microscope such as an AFM is provided in which the probe tip contacts a sample. A voltage source is coupled between the tip and sample for providing a bias voltage between the tip and sample. In one embodiment, this bias voltage has both ac and dc components.

Since only the probe tip is vibrated by electrostatic force, mechanical noise from other modes of vibration is eliminated and the force modulation can be performed at a much higher frequency compared to the conventional structures and methods (e.g. FMM and EFM). Furthermore, while conventional electrostatic force microscopy (EFM) is operated in noncontact mode, the present invention operates in contact mode. Another advantage is that the present invention measures both mechanical and electrical characteristics of a sample.

The method and system measure a variety of properties such as the tip-sample capacitive gradient, sample insulation thickness, tip-sample capacitance, sample mechanical hardness, sample surface potential, sample surface charge density, and sample topography and simultaneous combinations thereof.

The tip-sample capacitive gradient, the sample insulation thickness, and the tip-sample capacitance at a given location is measured by monitoring the vibration of the probe either at the frequency or at twice the frequency of the applied ac voltage while keeping the applied ac voltage constant.

The relative sample mechanical hardness is measured by monitoring the amplitude of the probe tip vibration at the frequency, or at twice the frequency, of the applied ac voltage. During this time, the ac and dc voltage component amplitude are maintained constant. A frequency spectrum for a local area is also obtained by, for example, changing the frequency of the ac applied voltage and monitoring the result on the amplitude of the vibration of the probe.

The polarity of the surface potential of the sample is measured by comparing the phase of the probe tip vibration to the phase of an ac voltage applied to the tip. A relative magnitude of surface potential is determined by holding the ac voltage component constant while maintaining the dc voltage component at zero and comparing the amplitude of the probe vibration for each location taking into account the hardness data to the corresponding amplitude for other locations. The absolute magnitude of the surface potential of the sample is measured by using a feedback loop to alter the dc voltage until a detected vibration is eliminated. The dc voltage at which this occurs is then measured and is determined to be equal to the absolute value of the surface potential.

The polarity of the surface charge density of the sample is measured by comparing the phase of the vibration of the probe tip at the frequency of the ac applied voltage to the phase of the ac applied voltage. The magnitude of the surface charge density of the sample is measured by adjusting the dc voltage applied to the probe tip until the system detects that a component of the tip vibration is eliminated.

The topography of the sample is measured by tracking the static deflection of the probe tip and is derived from the same signal that is used to manipulate the position of the tip in constant force mode.

DESCRIPTION OF THE DRAWINGS

FIG. 1b is a diagram of the probe tip of FIG. 1a.

FIGS. 4a and 4b illustrate two mechanically equivalent models for the tip-sample system operating in EFMM contact mode.

FIG. 5 is a diagram of probe vibration changes over different regions of material.

DETAILED DESCRIPTION OF THE PREFERRED EMBODIMENT

The structure of a microscope that uses EFMM is first described. Then, the use of EFMM technology to measure the (1) tip-sample capacitive gradient, (2) sample insulation thickness, (3) tip-sample capacitance (4) sample mechanical hardness, (5) sample surface potential, (6) sample surface charge, and (7) sample topography, are described in sequence. Finally, several advantages of EFMM over conventional microscopy are described.

Structure of an EFMM System

Figure 1A:
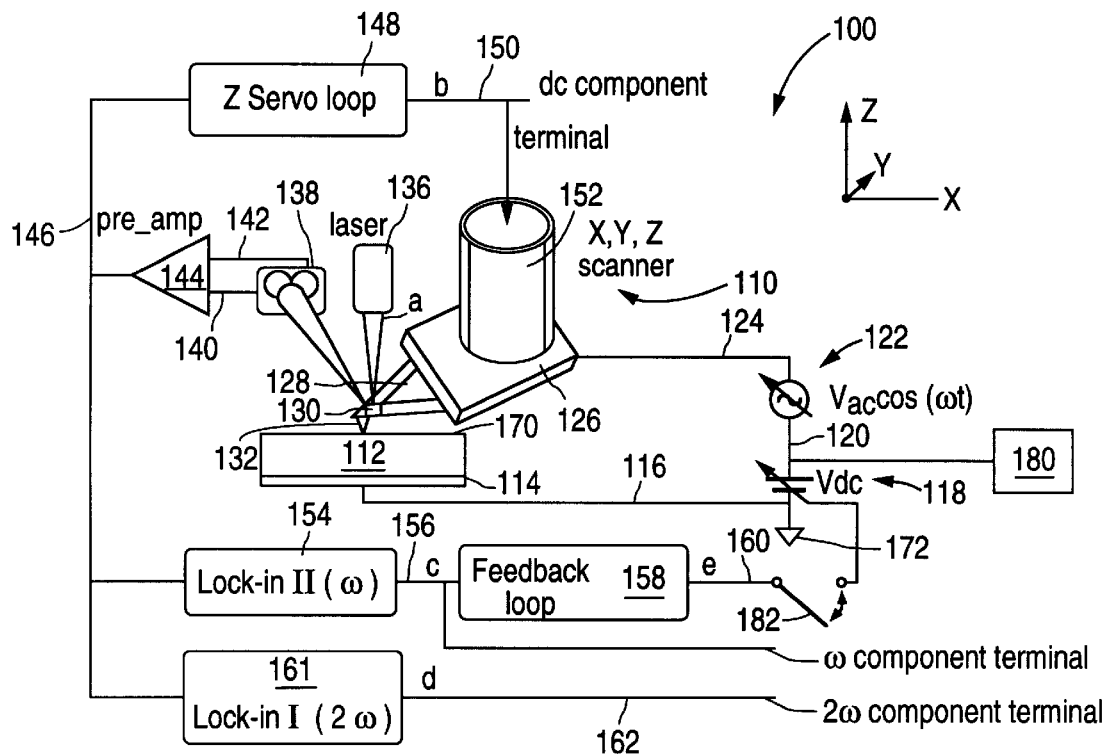
FIG. 1a is a schematic diagram of a microscope system employing an atomic force microscope operating in contact mode.
Figure 1B:
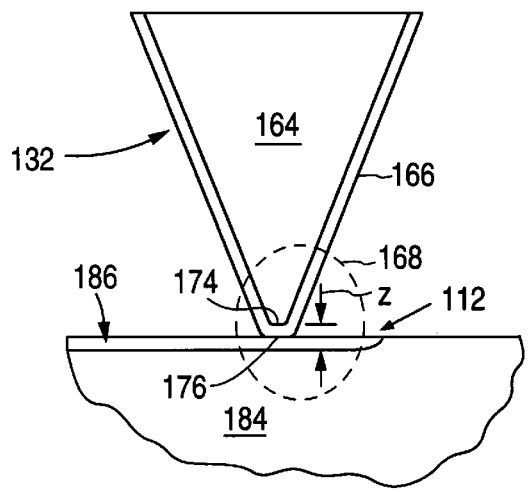

The structure of a microscope system is described with reference to FIGS. 1a and 1b. FIG. 1a is a schematic diagram of microscope system 100 ("system 100") employing an atomic force microscope 110 ("microscope 110") operating in contact mode. FIG. 1b is a diagram of probe tip 132 ("tip 132") of FIG. 1a.

In FIG. 1a, tip 132 contacts sample 112 at a surface 170. In FIG. 1b, tip 132 includes a conducting portion 164, an insulating portion 166, and an end region 168. Conducting and insulating portion 164 and 166 each have a respective apex 174 and apex 176.

Figure 1C:
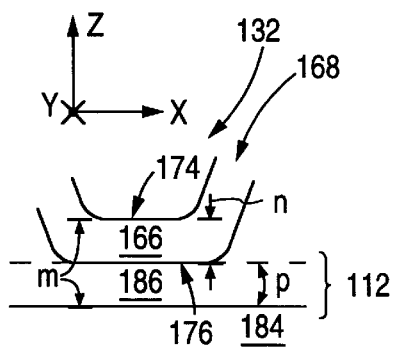
FIG. 1c is a detailed diagram of the point of contact between the tip and sample.

FIG. 1c is a detailed diagram of end region 168 of FIG. 1b showing the point of contact between tip 132 and sample 112. Sample 112 has a portion with is conducting or semi-conducting ("conducting portion 184") and an insulating portion 186 having a thickness "p" at the contact region with tip 132, which could be, for example, an oxide layer at the surface 170 of sample 112. In contact mode, apex 176 of insulating portion 166 of tip 132 contacts insulating portion 186 of sample 112 such that the total distance between apex 174 of conducting portion 164 of tip 132 and conducting portion 184 of sample 112 is distance "m". The thickness of insulating portion 166 between apex 174 and apex 176 is distance "n" in contact mode. Thus, distance "m" is equal to the sum of distance "n" and distance "p". In one sample 112, insulating layer 186 of sample 112 is not present and thus distance "p" equals zero and distance "m" equals distance "n".

Returning to FIG. 1a, sample 112 is held in place with a support (not shown) while tip 132 is attached to a flexible cantilever 128, which is supported by a cantilever support 126. Cantilever support 126 is connected to an x, y, z scanner 152 ("scanner 152") which is held by a support (not shown). Scanner 152 is used to move tip 132 relative to sample 112 in response to an input signal "b" described below.

In the above embodiment, only one scanner 152 is provided. In other embodiments, sample 112 is coupled to a scanner for movement of sample 112 instead of, or in addition to, cantilever support 126 being connected to scanner 152. In one embodiment, scanner 152 is a piezoelectric tube scanner which is described in an article by G. Binnig et al., *Review of Scientific Instruments*, v. 57, p. 1688 (August 1986), which is incorporated herein by reference in its entirety.

A voltage having a dc component ($V_{dc}$) and an ac component ($V_{ac}\cos\omega t$) is applied between sample 112 and tip 132 as follows. A conductive plate 114 ("plate 114") is coupled to the bottom surface of sample 112 while sample voltage line 116 couples plate 114 to a reference voltage 172. In the embodiment shown in FIG. 1a, reference voltage 172 is ground. Thus, in the embodiment shown in FIG. 1a, sample 112 is grounded. Plate 114 is used to facilitate the rapid uniform dissemination of reference voltage 172 (e.g. ground) throughout sample 112. However, in another embodiment, plate 114 is not present and sample voltage line 116 is coupled directly to sample 112.

Sample voltage line 116 is connected to a negative terminal 210 (FIG. 2) of an adjustable direct current voltage source 118 ("dc voltage source 118") which applies the dc voltage component $V_{dc}$ between negative terminal 210 and a positive terminal 220 (FIG. 2) of dc voltage source 118. A line 120 connects positive terminal 220 of dc voltage source 118 to adjustable alternating current voltage source 122 ("ac voltage source 122").

Ac voltage source 122 superimposes the ac voltage component $V_{ac}\cos\omega t$ onto the dc voltage component $V_{dc}$ and applies the resultant voltage $V_{ps}$ as defined by equation (1) below on a tip bias line 124. In one embodiment, tip bias line 124 connects ac voltage source 122 directly to conducting portion 164 of tip 132. In another embodiment, tip bias line 124 indirectly connects ac voltage source 122 to conducting portion 164 using an intermediate conductor (not shown). Therefore, the above structure applies a voltage $V_{ps}$ between tip 132 and sample 112 as defined by the following equation (1).

$$V_{ps} = V_{dc} + V_{ac}\cos\omega t \qquad (1)$$

Throughout this disclosure, "ω" represents the angular velocity of the ac voltage component ($V_{ac}\cos\omega t$) while "t"

represents time. Dc voltage source 118 is adjustable to selectively vary dc voltage component $V_{dc}$ while ac voltage source 122 is adjustable to selectively vary the amplitude of the ac voltage component $V_{ac}$ and/or the angular velocity ω. The resultant voltage $V_{ps}$ is with reference to the voltage applied to sample 112 which is not ground in some embodiments. In other embodiments, the voltage at tip 132 is held constant while the voltage of sample 112 is varied to maintain the voltage difference between tip 132 and sample of $V_{ps}$ as defined by equation (1). The voltages at tip 132 and sample 112 may both vary with respect to ground but the voltage between tip 132 and sample 112 has a dc and ac component as does voltage $V_{ps}$ as defined by equation (1).

Voltage $V_{ps}$ does not cause current to flow between tip 132 and sample 112 because tip 132 has insulating portion 166 at end region 168 of tip 132. In one embodiment, insulating portion 166 is a native oxide film.

In one embodiment, the position of tip 132 in the z-direction (the direction along the z-axis) is detected as described below. As shown in FIGS. 1a, a reflector 130 is attached to the back side of cantilever 128. A laser beam "a" emitted from a laser source 136 reflects off reflector 130 and onto position sensitive photo detector 138 ("PSPD 138"). As tip 132 moves vertically, the angle of incidence between laser beam "a" and reflector 130 changes, causing laser beam "a" to strike varying portions of PSPD 138 according to the position of tip 132 in the z direction. A preamplifier 144 receives the signals on pre-amplifier input lines 140 and 142 to provide an accurate analog signal on pre-amplifier output line 146, which signal represents the position of tip 132 in the z-direction.

Pre-amplifier output line 146 is connected to a z-servo loop 148, a ω-lock-in amplifier 154, and a 2ω-lock-in amplifier 161. The z-servo loop 148 detects the dc component of the signal on pre-amplifier output line 146, compares the dc component with a reference voltage $V_{ref}$ (not shown), and generates a dc component signal "b" on the scanner input line 150 (dc component terminal) to scanner 152. The position of tip 132 in the z direction is adjusted by scanner 152 in response to signal "b". The z-servo loop 148 adjusts signal "b" such that the dc component of the signal on preamplifier output line 146 becomes equal to the reference voltage $V_{ref}$. Therefore, the static deflection of the cantilever is maintained constant with signal "b" controlling scanner 152.

The static deflection of cantilever 128 depends on the contact force between tip 132 and sample 112. By maintaining constant contact force, tip 132 follows the true topography of surface 170 of sample 112. In one embodiment, the tip-sample interactive force is approximately 10 nN ($10^{-8}$N). In other embodiments, this interactive force is approximately in the range of 0.01 nN to 100 nN. Therefore, system 100 maps the topographical features of surface 170 of sample 112 while tracking the position of tip 132.

ω-lock-in amplifier 154 and 2ω-lock-in amplifier 161 detect and amplify the respective ω and 2ω-components of the signal on pre-amplifier output line 146 and output resultant signals "c" and "d" on ω-amplifier output line 156 (ω-component terminal) and 2ω-amplifier output line 162 (2ω-component terminal), respectively. ω-lock-in amplifier 154 operates at the same frequency "ω" as the frequency of the ac voltage component ($V_{ac}\cos\omega t$). 2ω-lock-in amplifier 161 operates at twice the frequency "2ω" of the ac voltage component ($V_{ac}\cos\omega t$).

Signals "c" and "d" respectively represent and are proportional to the ω-component and 2ω-component of tip 132 movement in the z-direction. The voltage amplitude "$V_c$" of signal "c" is related to the amplitude of the ω-component of tip 132 movement "$z_\omega$" by equation (2).

$$V_c = a_\omega \times z_\omega \qquad (2)$$

"$a_\omega$" represents the transfer function between the amplitude of the ω-component of tip 132 movement "$z_\omega$" measured in unit length in the z-direction "$V_c$" measured in volts.

The voltage amplitude "$V_d$" of signal "d" is related to the amplitude of the 2ω-component "$z_{2\omega}$" of tip 132 movement in the z-direction by equation (3).

$$V_d = a_{2\omega} \times z_{2\omega} \qquad (3)$$

"$a_{2\omega}$" represents the transfer function between the amplitude of the 2ω-component of tip 132 movement "$z_{2\omega}$" measured in unit length "$V_d$" measured in volts. The transfer functions "$a_\omega$" and "$a_{2\omega}$" are approximated as being constant. "$V_c$" and "$V_d$" are determined, for example, by coupling a amplitude detector to ω-amplifier output line 156.

The transfer functions for signals "c" and "d" are obtained empirically, in one embodiment, by observing the change in voltages "$V_c$" and "$V_d$" on ω-amplifier output line 156 and 2ω-amplifier output line 162, respectively, and comparing this voltage with a known vibration amplitude of tip 132. Therefore, equation (2) and equation (3) are used to derive the respective ω-component and 2ω-component vibration amplitudes of tip 132.

Signal "c", representing the ω-component of vertical tip 132 movement, is received by a feedback loop 158. When feedback loop 158 is coupled to dc voltage source 118 (i.e., switch 182 is closed), feedback loop 158 adjusts the dc voltage component $V_{dc}$ of dc voltage source 118 by applying signal "e" on feedback output line 160 until signal "c" is canceled as described below. When switch 182 is open, feedback loop 158 does not control the dc voltage source 118. Feedback loop 158 may be, for example, an operational amplifier. As described for each of the properties measured below, feedback loop 158 is only used in measuring some of the properties of sample 112.

The operation of system 100 to measure the properties of the (1) tip-sample capacitive gradient, (2) sample insulation thickness, (3) tip-sample capacitance, (4) sample mechanical hardness, (5) sample surface potential, (6) sample surface charge, and (7) sample topography is described in sequence below.

1. Tip-Sample Capacitive Gradient.

A parallel plate capacitor is a good model of a capacitor having conducting portion 164 of tip 132 as one plate and conducting portion 184 of sample 112 as the other plate when the tip 132-sample 112 system is in contact mode. This is because apex 174 of conducting portion 164 is close enough to the conducting portion 184 that the capacitive effect of the side walls (surfaces not part of apex 174) is negligible. Therefore, apex 164 and a corresponding approximately parallel surface of conducting portion 184 of sample 112 act as the two plates of the capacitor.

The electrostatic force $F_e$ caused by a voltage between two plates of a parallel plate capacitor (i.e. conducting portion 164 and conducting portion 184) is defined by equation (4).

$$F_e = \frac{1}{2}\frac{dC}{dm}V_{ps}^2 \qquad (4)$$

In equation (4), dC/dm is the gradient of the capacitance between tip 132 and sample 112 as "m" varies. Referring to FIG. 1c, "m" is the distance between apex 174 of conducting portion 164 of tip 132 and conducting portion 184 of sample 112 with tip 132 operating in contact mode.

Equation (5) is derived by substituting $V_{ps}$ of equation (1) into equation (4).

$$F_e = \frac{1}{2}\frac{dC}{dm}(V_{dc} + V_{ac}\cos\omega t)^2 \qquad (5)$$

Since the value of $\cos\omega t$ varies with time, the electrostatic force $F_e$ also varies with time. The varying electrostatic force $F_e$ causes the distance "m" to vary as insulating portions 166 and 186 are subject to varying compressive pressures. However, the variations in distance "m" due to the variations in compressive pressure exerted by the tip 132—sample 112 interaction is negligible for a hard sample. Therefore, distance "m" is approximated as being a constant for each specific location on sample 112 when system 100 is in contact mode. Thus, the capacitive gradient dC/dm is also approximated as being a constant for each specific location on sample 112. However, as the location within sample 112 changes, the thickness of insulating portion 186 (distance "p") on sample 112 can also change, causing distance "m" to change.

Equation (6) is derived by expanding equation (5).

$$F_e = \frac{1}{2}\frac{dC}{dm}\{V_{dc}^2 + 2V_{dc}V_{ac}\cos\omega t + V_{ac}^2\cos^2\omega t\} \qquad (6)$$

Since $\cos^2\omega t$ is equal to $(1+\cos 2\omega t)/2$, equation (7) is derived from equation (6).

$$F_e = \frac{1}{2}\frac{dC}{dm}\left\{V_{dc}^2 + 2V_{dc}V_{ac}\cos\omega t + \frac{1}{2}V_{ac}^2(1 + \cos 2\omega t)\right\} \qquad (7)$$

Equation (7) shows that there is a 2ω-component, a ω-component, and a dc-component in the electrostatic force $F_e$. Also note that the ω-component depends on the dc voltage component $V_{dc}$ and the ac voltage component $V_{ac}$ while the 2ω-component depends on the ac voltage component $V_{ac}$ only.

In a first embodiment, the capacitive gradient dC/dm is determined by monitoring signal "d" as follows. The amplitude of the 2ω-component of the electrostatic force $F_e$ "$F_{e,2\omega}$" (proportional to "$V_d$") is derived from equation (7) to obtain equation (8).

$$F_{e,2\omega} = (¼)(dC/dm)(V_{ac}^2) \qquad (8)$$

Equation (9) is obtained by solving equation (8) for the capacitive gradient.

$$dC/dm = 4F_{e,2\omega}/V_{ac}^2 \qquad (9)$$

Another equation for the 2ω-component of electrostatic force $F_{e,2\omega}$ is described. Equation (10) is identical to equation (3) and, for clarity, is repeated.

$$V_d = a_{2\omega} \times z_{2\omega} \qquad (10)$$

Equation (11) is obtained by solving equation (10) for $z_{2\omega}$.

$$z_{2\omega} = V_d/a_{2\omega} \qquad (11)$$

The values of voltage "$V_d$" and the transfer function "$a_{2\omega}$" are known and thus the deflection amplitude of the tip 132 due to the amplitude of the 2ω-component vibration ($z_{2\omega}$) can be determined.

Equation (12) is a well known equation relating force to deflection. Equation (12) defines the electrostatic force due to 2ω-component vibration ($z_{2\omega}$).

$$F_{e,2\omega} = k_{eff,2\omega} \times z_{2\omega} \qquad (12)$$

"$k_{eff,2\omega}$" is the effective hardness of the tip-sample system at frequency 2ω and is the sum of the sample 112 hardness at frequency 2ω "$k_{ts,2\omega}$" and the cantilever 128 stiffness "$k_1$" at frequency 2ω (i.e., $k_{eff,2\omega} = k_{ts,2\omega} + k_1$). Conventional FMM techniques can measure the hardness profile for sample 112 at each location on surface 170. Therefore, the value of "$k_{ts,2\omega}$" can be determined. Since the cantilever stiffness "$k_1$" is typically known, "$k_{eff,2\omega}$" can be determined.

Equation (13) is obtained by substituting the value of $z_{2\omega}$ of equation (11) into equation (12) and substituting "$k_{ts,2\omega} + k_1$" for "$k_{eff,2\omega}$".

$$F_{e,2\omega} = (k_{ts,2\omega} + k_1) \times (V_d/a_{2\omega}) \qquad (13)$$

Finally, substituting the value $F_{e,2\omega}$ from equation (13) into equation (9) results in equation (14).

$$dC/dm = 4(k_{ts,2\omega} + k_1) \times V_d/(a_{2\omega} \times V_{ac}^2) \qquad (14)$$

The values of the hardness "$k_{ts,2\omega}$", the cantilever 128 stiffness "$k_1$", the voltage "$V_d$", the transfer function "$a_{2\omega}$", and the amplitude of the ac voltage component "$V_{ac}$" are known quantities. Therefore, signal "d" is monitored while keeping the amplitude of the ac voltage component $V_{ac}$ constant while equation (14) is used to determine the capacitive gradient dC/dm at a given location.

In this embodiment, the measurement of capacitive gradient dC/dm is independent of the value of the dc voltage component $V_{dc}$. Therefore, switch 182 may be open or closed in the first embodiment.

In a second embodiment, the capacitive gradient dC/dm is determined by monitoring signal "c" as follows. The vibration amplitude ($F_{e,\omega}$) (proportional to "$V_c$") of the ω-component of electrostatic force is derived from equation (7) to obtain equation (15).

$$F_{e,\omega} = (dC/dm)(V_{dc}V_{ac}) \qquad (15)$$

Equation (16) is obtained by solving equation (15) for the capacitive gradient.

$$dC/dm = F_{e,\omega}/V_{dc}V_{ac} \qquad (16)$$

Another equation for the ω-component of electrostatic force $F_{e,\omega}$ is also determined. Equation (17) is identical to equation (2).

$$V_c = a_\omega \times z_\omega \qquad (17)$$

Equation (18) is obtained by solving for $z_\omega$.

$$z_\omega = V_c/a_\omega \tag{18}$$

The voltage "$V_c$" and the transfer function "$a_\omega$" are known and thus the deflection of the tip 132 due to ω-component vibration ($z_\omega$) can be determined.

Equation (19) defines the electrostatic force due to 2ω-component vibration ($z_{2\omega}$).

$$F_{e,\omega} = (k_{ts,\omega} + k_1) \times z_\omega \tag{19}$$

"$k_{t,s\omega}$" is the hardness of the sample 112 at frequency ω which can be determined for all location of sample 112 using conventional FMM techniques. "k1" is the stiffness of cantilever 128 at frequency ω.

Equation (20) is obtained by substituting the value of $z_\omega$ of equation (18) into equation (19).

$$F_{e,\omega} = (k_{ts,\omega} + k_1) \times (V_c/a_\omega) \tag{20}$$

Finally, substituting the value $F_{e,\omega}$ from equation (20) into equation (16) results in equation (21).

$$dC/dm = (k_{ts,\omega} + k_1) \times V_c/(a_\omega V_{dc} V_{ac}) \tag{21}$$

The values of the hardness "$k_{ts,\omega}$", the cantilever 128 stiffness "$k_1$", the voltage "$V_c$", the transfer function "$a_\omega$", and the amplitude of the ac and dc voltage components "$V_{ac}$" and "$V_{dc}$" are known quantities. Therefore, voltage "$V_c$" is monitored while keeping the amplitude of the ac and dc voltage components $V_{ac}$ and $V_{dc}$ constant while equation (21) is used to determine the capacitive gradient dC/dm at a given location. In this embodiment, switch 182 must be closed.

2. Sample Insulation Thickness

Once the capacitive gradient dC/dm is determined, for example, by one of the processes described above, the sample insulation thickness can be determined as follows.

In a parallel plate capacitor model, capacitance C is defined by the well known equation (22).

$$C = K_\epsilon(A/m) \tag{22}$$

"$K_\epsilon$" is the combined effective dielectric constant of the insulating portions 166 and 186 between apex 174 of conducting portion 164 and conducting portion 184 of sample 112. "A" is the capacitive area and is approximated as the area of contact between apex 176 of insulating layer 166 of tip 132 and sample 112 (the capacitive effect of the side walls of tip 132 are negligible in contact mode). "m" (FIG. 1c) is the distance between the plates of the modeled capacitor (i.e., the distance between apex 174 of conducting portion 164 of tip 132 and the conducting portion 184 of sample 112).

An independent equation for the capacitive gradient dC/dm is obtained by differentiating equation (22) with respect to "m" and solving for dC/dm to obtain equation (23).

$$dC/dm = -K_\epsilon(A/m^2) \tag{23}$$

Equation (24) is obtained by solving equation (23) for distance "m".

$$m = [(-K_\epsilon \times A)/(dC/dm)]^{1/2} \tag{24}$$

In the first embodiment, the capacitive gradient dC/dm is determined by monitoring signal "d" to detect voltage "$V_d$". The capacitive gradient dC/dm is defined by equation (25) which is identical to equation (14).

$$dC/dm = 4(k_{ts,2\omega} + k_1) \times V_d/(a_{2\omega} \times V_{ac}^2) \tag{25}$$

Equation (26) is obtained by substituting the value of the capacitive gradient dC/dm from equation (25) into equation (24).

$$m = \{(-K_\epsilon A a_{2\omega} V_{ac}^2)/[4(k_{ts,2\omega} + k_1)V_d]\}^{1/2} \tag{26}$$

Equation (27) reflects the relationship between the distances shown in FIG. 1c.

$$p = m - n \tag{27}$$

Equation (28) substitutes the value of distance "m" from equation (26) into equation (27).

$$p = \{(-K_\epsilon A a_{2\omega} V_{ac}^2)/[4(k_{ts,2\omega} + k_1)V_d]\}^{1/2} - n \tag{28}$$

The dielectric constant "$K_\epsilon$", the capacitive area "A", the transfer function "$a_{2\omega}$", the amplitude of the ac voltage component "$V_{ac}$", the hardness "$k_{ts,2\omega}$", the stiffness "$k_1$", the voltage "$V_d$", and the distance "n" are all known values and thus equation (28) is used to determine the value of distance "p".

Therefore, the sample insulation thickness (defined in FIG. 1c by distance "p") is determined in the first embodiment, by monitoring signal "d" and keeping the ac voltage component $V_{ac}$ constant. Since the insulating thickness (distance "p") is independent of the dc voltage component $V_{dc}$ in the first embodiment, switch 182 can be either open or closed.

In the second embodiment, the capacitance is determined by monitoring signal "c" to detect voltage "$V_c$". The capacitive gradient dC/dm is defined by equation (29) which is identical to equation (21).

$$dC/dm = (k_{ts,\omega} + k_1) \times V_c/(a_\omega V_{dc} V_{ac}) \tag{29}$$

Equation (30) is obtained by substituting the value of the capacitive gradient dC/dm from equation (29) into equation (24).

$$m = \{(-K_\epsilon A a_\omega V_{dc} V_{ac})/[(k_{ts,\omega} + k_1) \times V_c]\}^{1/2} \tag{30}$$

Equation (31) is obtained by substituting the value of distance "m" from equation (30) into equation (27).

$$d = \{(-K_\epsilon A a_\omega V_{dc} V_{ac})/[(k_{ts,\omega} + k_1) \times V_c]\}^{1/2} - n \tag{31}$$

The dielectric constant "$K_\epsilon$", the capacitive area "A", the transfer function "$a_\omega$", the amplitude of the ac voltage component "$V_{ac}$", the hardness "$k_{ts,\omega}$", the stiffness "$k_1$" and the distance "n" are known values while the voltage "$V_c$" can be determined. Therefore, equation (31) is used to determine the value of distance "p".

Therefore, the sample insulation thickness (defined in FIG. 1c by distance "p") is determined in the second embodiment, by monitoring signal "c" and keeping the ac and dc voltage components $V_{ac}$ and $V_{ac}$, respectively, constant. Since the dc voltage component $V_{dc}$ should be constant, switch 182 is open.

3. Tip Sample Capacitance

Once the value of distance "m" is known, the capacitance C of the tip 132-sample 112 system can be determined as follows. The well known equation for capacitance is described in equation (32).

$$C=K_e(A/m) \tag{32}$$

The dielectric constant "$K_e$", capacitive area "A", and distance "m" are all known quantities. Therefore, equation (32) is used to determine the capacitance "C".

In one embodiment, tip 132 has a radius at its contact point of 50 nm, has an effective area of $\pi \times 50$ nm$\times 50$ nm or 7854 nm$^2$, and has a thickness "m" in the range of from 1 nm to 10 nm. Therefore, if the dielectric constant is equal to one microfarad ($\mu$F) per nanometer, and the thickness "m" is 1 nm, equation (32) is used to calculate that the capacitance is equal to (1 $\mu$F/nm)$\times$(7854 nm$^2$/1 nm) which equals 7854 $\mu$F. Thus, the present invention can measure capacitance "C".

4. Sample Mechanical Hardness

Figure 2:
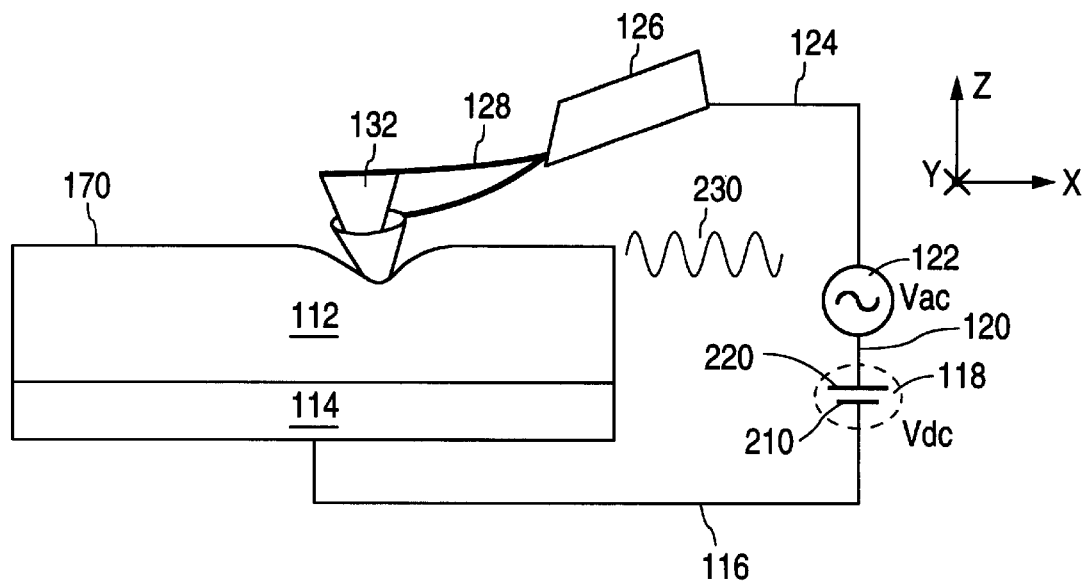
FIG. 2 is a diagram of the tip of FIG. 1a and FIG. 1b interacting with a sample in contact mode.

FIG. 2 is a diagram of tip 132 interacting with sample 112 in contact mode. The electrostatic force between tip 132 and sample 112 makes tip 132 indent surface 170 of sample 112 (the indentation shown in FIG. 2 is exaggerated for clarity). The amount of indentation depends on the hardness of sample 112 and on the strength of the electrostatic force ($F_e$).

In FIG. 2, a wave form 230 represents the $\omega$-component of tip 132 vibration which has an amplitude and phase change that are measurable though tip 132 is in contact with sample surface 170. The $\omega$-component of tip 132 vibration is applied as signal "c" on $\omega$-amplifier output line 156.

One possible reason why the vibration amplitude and phase change are detectable is described. In contact mode operation, there are only thin layers of insulator (insulating portions 166 and 186 of FIG. 1b) between each plate of the modeled capacitor where conducting portion 164 is one plate and conducting portion 184 is the other plate. Therefore, the tip 132—sample 112 capacitance is much larger than in noncontact mode operation. Thus, even small applied voltages generate large electrostatic forces.

The materials of sample 112 have a certain compliance according to the Young's modulus (modulus of elasticity) for the materials. Therefore, the large electrostatic force $F_e$ drives tip 132 to vibrate to detectable amplitudes and phases even though tip 132 contacts surface 170 of sample 112.

Figure 3:
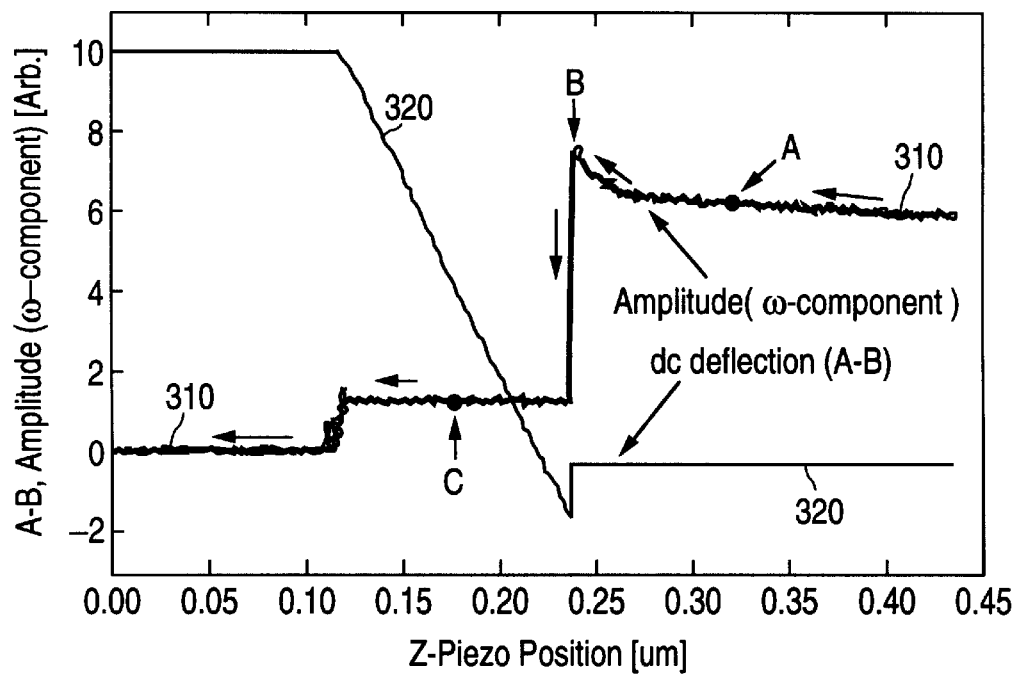
FIG. 3 is a graph showing the measured ω-component vibration amplitude and the static deflection of the tip cantilever as the tip moves downward in the negative z-direction.

FIG. 3 is a graph showing the measured $\omega$-component vibration amplitude represented by line 310 and the static deflection of cantilever 128 represented by line 320 as tip 132 moves downward in the negative z-direction. When tip 132 is placed in the noncontact region such as at point "A", the voltage "$V_c$" represented on $\omega$-amplifier output line 156 increases as tip 132 approaches sample 112. In the noncontact region, the average deflection (static deflection) of cantilever 128 is zero. When tip 132 makes contact with surface 170 (point "B"), the amplitude of tip 132 vibration (line 310) is suddenly attenuated. In region "C", although the electrostatic force $F_e$ is larger than in region "A", the vibration amplitude (line 310) of tip 132 is much smaller since surface 170 of sample 112 has a much larger spring constant than that of cantilever 128. The amplitude of this small vibration depends on the mechanical hardness of sample surface 170. By monitoring the voltage "$V_c$" present on $\omega$-amplifier output line 156, the hardness of sample 112 is investigated as described below.

FIGS. 4a and 4b illustrate two mechanically equivalent models for the tip-sample system operating in EFMM contact mode. These models indicate that the effective stiffness ($k_{eff}$) of the tip-sample system is the sum of the cantilever 128 stiffness ($k_1$) and the tip-sample stiffness ($k_{ts}$). The mechanical resonance frequency of this system is much higher than that of a free oscillating cantilever in noncontact mode which would merely equal the cantilever stiffness ($k_1$). Therefore, the frequency of tip 132 can be made much higher in contact mode than in noncontact mode without reaching resonant frequencies. If tip 132 were vibrating at a resonant frequencies, tip 132 movement would be exaggerated and system 100 would lose accuracy. Therefore, tip 132 can be operated at higher frequencies.

In a first embodiment, the tip-sample hardness $k_{ts}$ is determined as follows. The relationship between the hardness and relative amplitude of probe vibration is defined by equation (33).

$$F_{e,\omega}=(k_{ts,\omega}+k_1)\times z_\omega \tag{33}$$

"$F_{e,\omega}$" represents the amplitude of the $\omega$-component of electrostatic force at a given location. "$z_\omega$" represents the amplitude of the $\omega$-component of tip 132 vibration at a given location caused by the amplitude of the $\omega$-component of electrostatic force "$F_{e,\omega}$".

Equation (34) is equation (33) solved for hardness "$k_{ts,\omega}$".

$$k_{ts,\omega}=F_{e,\omega}/z_\omega-k_1 \tag{34}$$

Electrostatic force "$F_e$" is defined by equation (7) and for the convenience of the reader is repeated below as equation (35).

$$F_e = \frac{1}{2}\frac{dC}{dm}\left\{V_{dc}^2 + 2V_{dc}V_{ac}\cos\omega t + \frac{1}{2}V_{ac}^2(1+\cos 2\omega t)\right\} \tag{35}$$

The amplitude of the $\omega$-component of electrostatic force "$F_{e,\omega}$" is derived from equation (35) to obtain equation (36).

$$F_{e,\omega}=(dC/dm)V_{dc}V_{ac} \tag{36}$$

Substituting the value of the $\omega$-component of electrostatic force $F_{e,\omega}$ from equation (36) into equation (34) yields equation (37).

$$k_{ts,\omega}=(dC/dm)V_{dc}V_{ac}/z_\omega-k_1 \tag{37}$$

Equation (2) defines the value for the amplitude of the $\omega$-component of vibration "$z_\omega$" and, for clarity, is repeated below as equation (38) for clarity.

$$V_c=a_\omega \times z_\omega \tag{38}$$

Equation (38) solved for the value $z_\omega$ yields equation (39).

$$z_\omega=V_c/a_\omega \tag{39}$$

Equation (40) is obtained by substituting the value of "$z_\omega$" from equation (39) into equation (37).

$$k_{ts,\omega}=(dC/dm)V_{dc}V_{ac}a_\omega/V_c-k_1 \tag{40}$$

At this point, it is assumed that distance "m" is constant or close to constant. If this assumption is not true, hardness $k_{ts}$ is measured with conventional FMM techniques. This assumption means that the capacitive gradient dC/dm is constant or has negligible variations. Since the capacitive gradient "dC/dm", the amplitude of the ac and dc voltage components "$V_{ac}$" and "$V_{dc}$", and the transfer function "$a_\omega$" are constants, the hardness "$k_{ts,\omega}$" is roughly inversely proportional to the voltage "$V_c$".

In a second embodiment, the tip-sample hardness $k_{ts}$ is determined as follows. The relationship between the hardness and relative amplitude of probe vibration is defined by equation (41).

$$F_{e,2\omega}=(k_{ts,2\omega}+k_1)\times z_{2\omega} \tag{41}$$

"$F_{e,2\omega}$" represents the amplitude of the 2ω-component of electrostatic force at a given location. "$z_{2\omega}$" represents the amplitude of the 2ω-component of tip 132 vibration at a given location caused by the amplitude of the 2ω-component of electrostatic force "$F_{e,2\omega}$".

Equation (42) is equation (41) solved for hardness $k_{ts,2\omega}$.

$$k_{ts,2\omega}=F_{e,2\omega}/z_{2\omega}-k_1 \tag{42}$$

Electrostatic force "$F_e$" is defined by equation (7) and for the convenience of the reader is repeated below as equation (43).

$$F_e = \frac{1}{2}\frac{dC}{dm}\left\{V_{dc}^2 + 2V_{dc}V_{ac}\cos\omega t + \frac{1}{2}V_{ac}^2(1+\cos 2\omega t)\right\} \tag{43}$$

The amplitude of the 2ω-component of electrostatic force "$F_{e,2\omega}$" is derived from equation (43) to obtain equation (44).

$$F_{e,2\omega}=(\tfrac{1}{4})(dC/dm)V_{ac}^2 \tag{44}$$

Substituting the value of the 2ω-component of electrostatic force $F_{e,2\omega}$ from equation (44) into equation (42) yields equation (45).

$$k_{ts,2\omega}=(\tfrac{1}{4})(dC/dm)V_{ac}^2/z_{2\omega}-k_1 \tag{45}$$

Equation (3) defines the value for the 2ω-component of position "$z_{2\omega}$" and, for clarity, is repeated below as equation (46).

$$V_d=a_{2\omega}\times z_{2\omega} \tag{46}$$

Equation (46) solved for the value $z_{2\omega}$ yields equation (47).

$$z_{2\omega}=V_d/a_{2\omega} \tag{47}$$

Equation (48) is obtained by substituting the value of "$z_{2\omega}$" from equation (47) into equation (45).

$$k_{ts,2\omega}=(\tfrac{1}{4})(dC/dm)V_{ac}^2 a_{2\omega}/V_d-k_1 \tag{48}$$

At this point, it is again assumed that distance "m" is constant or close to constant. If this assumption is not true, hardness $k_{ts}$ is measured with conventional FMM techniques. This assumption results in capacitive gradient dC/dm being constant or having negligible variations. Since the capacitive gradient "dC/dm", the amplitude of the ac voltage component "$V_{ac}$", and the transfer function "$a_{2\omega}$" are constants, the hardness $k_{ts,2\omega}$ is roughly inversely proportional to voltage "$V_d$".

Therefore, in the first embodiment, relative mechanical hardness is determined by keeping "$V_{dc}$" and "$V_{ac}$" constant and switch 182 open. Signal "c" is monitored to detect voltage "$V_c$" and equation (40) is applied.

In the second embodiment, relative mechanical hardness is determined by keeping "$V_{ac}$" constant. Signal "d" is monitored to detect voltage "$V_d$" and equation (48) is applied. Since "Vdc" is not a factor in equation (48), switch 182 may be open or closed in the second embodiment.

FIG. 5 is a diagram of probe vibration changes over different regions of material. As tip 132 transitions from contacting hard region 510 to contacting soft region 520 of sample 112, the vibration amplitude 530 of signal "c" or signal "d" of tip 132 increases. Therefore, the present invention enables the measurement of relative hardness profile of a sample if the separation distance "m" between the conducting portion 164 of tip 132 and the conducting portion 184 of sample 112 is relatively constant.

In a third embodiment, the ac bias frequency ω is varied while the ω-component of tip 132 vibration is measured at a fixed location to obtain the frequency dependent local hardness, i.e. local hardness spectrum, $k_{\mathit{eff},x}(\omega)$. In this embodiment, tip 132 is not scanned in either the x or y-directions with respect to sample 112. Therefore, the assumption that distance "m" and thus capacitive gradient "dC/dm is constant is true. Thus, voltage "$V_c$" or "$V_d$" is observed at a single location to determine the hardness of a location of sample 112 for a variety of different frequencies to determine the local hardness spectrum of the location on surface 170 of sample 112. In this third embodiment, the dc bias voltage $V_{dc}$ need not be adjusted. Therefore, switch 182 is open.

5. Measurement of Surface Potential

Figure 6:
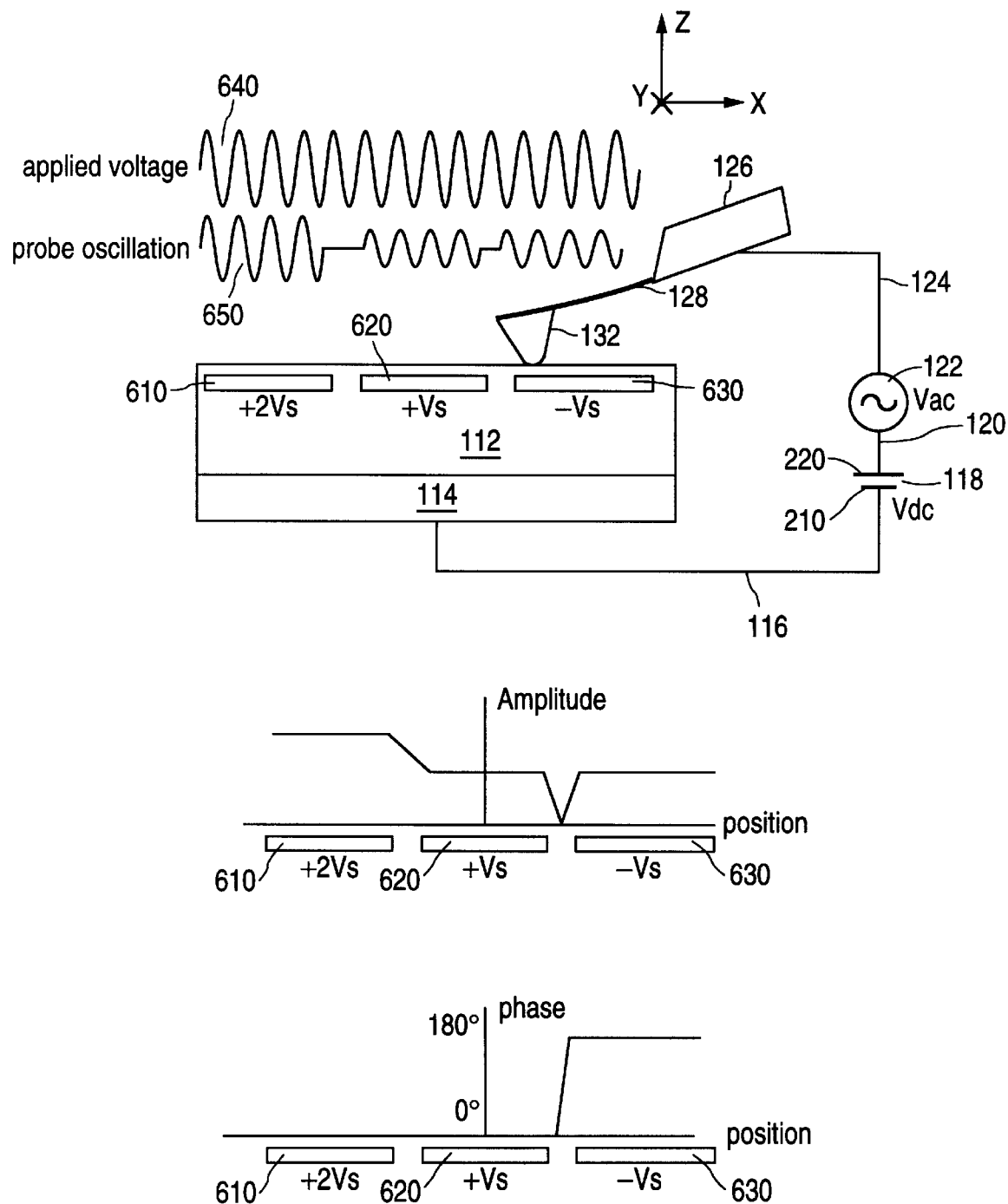
FIG. 6 is a diagram showing the tip 132 vibrations resulting from different surface potentials.

FIG. 6 is a diagram showing the tip 132 vibrations resulting from different surface potentials. Sample 112 comprises three regions 610, 620, and 630 having different surface potentials. FIG. 6 also shows the ω-component applied voltage 640 as well as the probe oscillation 650. For illustrative purposes, FIG. 6 shows that the surface potential $V_{dc,s}$ of region 610 having a voltage +2$V_s$ is twice the surface potential $V_{dc,s}$ of region 620 having a voltage +$V_s$. The surface potential $V_{dc,s}$ of region 630 having a voltage −$V_s$ is equal in magnitude but opposite in polarity to the surface potential $V_{dc,s}$ of region 620 having a voltage +$V_s$.

As apparent from FIG. 6, larger surface potentials cause larger amplitude of tip 132 oscillation. Surface potentials of a negative polarity cause probe oscillation out of phase with the probe oscillation caused by surface potentials of a positive polarity. These effects are described in detail below.

The measurements of the relative magnitude of surface potential, the polarity of the surface potential, and the absolute magnitude of surface potential is described. For clarity, equation (7) is repeated as equation (49).

$$F_e = \frac{1}{2}\frac{dC}{dm}\left\{V_{dc}^2 + 2V_{dc}V_{ac}\cos\omega t + \frac{1}{2}V_{ac}^2(1+\cos 2\omega t)\right\} \tag{49}$$

When there is surface potential distribution on surface 170 of sample 112, the dc voltage component $V_{dc}$ term in equation (49) is replaced with ($V_{dc,s}-V_{dc}$), where $V_{dc,s}$ is the surface potential. Although the term "($V_{dc,s}-V_{dc}$)" is used, the term "($V_{dc}-V_{dc,s}$)" could also be used. However, there is no difference in the result for relative and absolute magnitudes. Equation (49) is thus rewritten as the equation (50).

$$F_e = \frac{1}{2}\frac{dC}{dm}\{(V_{dc,s} - V_{dc})^2 + \qquad (50)$$

$$2(V_{dc,s} - V_{dc})V_{ac}\cos\omega t + \frac{1}{2}V_{ac}^2(1 + \cos 2\omega t)\}$$

The amplitude of the ω-component of the electrostatic force $F_{e,\omega}$ is derived from equation (50) and is defined by equation (51).

$$F_{e,\omega} = (dC/dm)(V_{dc,s} - V_{dc})V_{ac} \qquad (51)$$

As apparent from equation (51), "$F_{e,\omega}$" is directly related to the difference between the static surface potential $V_{dc,s}$ and the dc voltage component $V_{dc}$ on tip 132, keeping the amplitude of the ac voltage component $V_{ac}$ constant and assuming a constant capacitive gradient dC/dm.

If the capacitive gradient "dC/dm" and the applied ac voltage component "$V_{ac}$" are constant and the applied dc voltage component "$V_{dc}$" is zero, the voltage "$V_c$" (proportional to "$F_{e,\omega}$" of equation (51) assuming a constant hardness) for one location can be compared to the voltage "$V_c$" for another location to determine the relative magnitude of surface potential comparing the two locations. If the hardness profile of sample 112 is not constant, but is known, the voltage "$V_c$" is still compared across different locations but the hardness differences are also considered. For example, assume that location A (not shown) has a hardness twice that of location B (not shown). If voltage "$V_c$" measured while tip 132 is at location A is equal to the voltage "$V_c$" measured while tip 132 is at location B, then the relative surface potential at location A is twice that of location B.

The polarity of the surface potential $V_{dc,s}$ is determined as follows. In this example, dc bias voltage $V_{dc}$ is set at zero volts. Since $V_{dc}$ is zero, the ω-component of equation (51) is directly proportional to $V_{dc,s}$. The ω-component of tip 132 vibration amplitude represents $V_{dc,s}$ as shown in FIG. 6. Therefore, the measured phase from ω-lock-in amplifier 154 at frequency ω represents the polarity of the surface potential $V_{dc,s}$. For a positive surface potential $V_{dc,s}$, the output from the lock-in amplifier at frequency ω is "in phase" with the ac bias voltage ($V_{ac}\cos\omega t$), and for a negative surface potential $V_{dc,s}$, frequency ω is "out of phase" with the ac bias voltage ($V_{ac}\cos\omega t$) by 180 degrees. In one embodiment, a lock-in amplifier with an R-θ mode is used for the measurement of the phase signal. In R-θ mode, the output of channel two is a phase signal θ.

The absolute magnitude of the surface potential $V_{dc,s}$ is determined as follows. In this example, feedback loop 158 is used to adjust the dc voltage component $V_{dc}$ of tip 132 such that the voltage "$V_c$" of signal "c" vanishes. In this situation, the term "($V_{dc,s} - V_{dc}$)" is equal to zero and thus the dc voltage component $V_{dc}$ is equal to the surface potential $V_{dc,s}$. When the ω-component vanishes, an apparatus 180 (FIG. 1) is signaled to measure the voltage $V_{dc}$ across positive and negative terminals 220 and 210, respectively, and determines that the surface potential $V_{dc,s}$ of the region is equal to the measured voltage difference $V_{dc}$. In measuring absolute magnitude of surface potential according to the above process, hardness need not be constant throughout sample 112 in order to obtain the surface potential profile of sample 112.

Figure 7A:
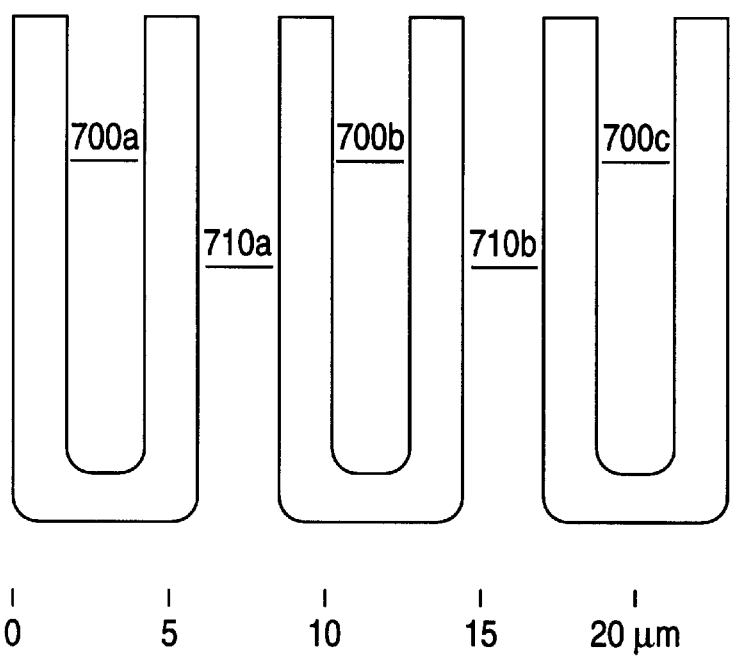
FIG. 7a and FIG. 7b show the respective topographic (FIG. 7a) and surface potential (FIG. 7b) trace images of a test pattern, where one set of the trace is biased at a positive voltage and the other set of the trace is biased at a negative voltage of equal magnitude.
Figure 7B:
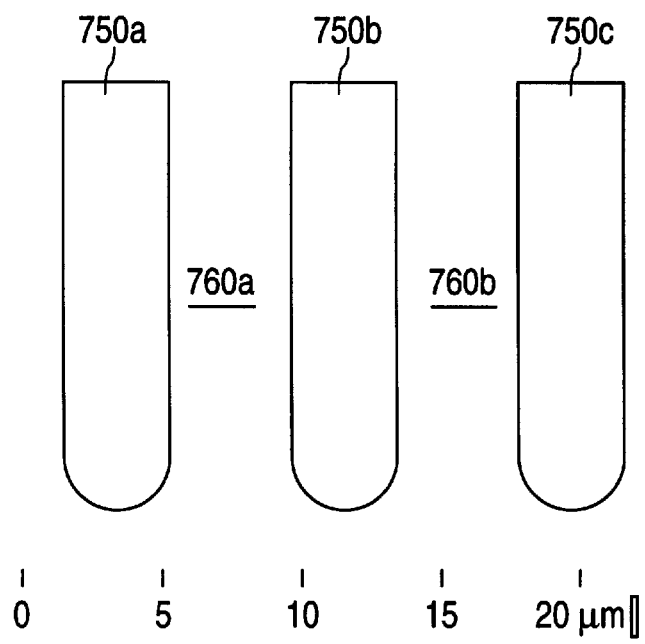

FIG. 7a and FIG. 7b show the respective topographic (FIG. 7a) and surface potential (FIG. 7b) trace images of a test pattern. One trace has three connected elevated extensions and is grounded. A second trace has two connected elevated extensions and is biased at 5 volts. In FIG. 7a, white regions represent elevated areas. White regions 700a, 700b, 700c represent the three elevated extensions of the first trace (the connection between the three extensions is not shown in FIG. 7a). White regions 710a and 710b represent the two elevated extensions of the second trace.

In FIG. 7b, white areas represent areas of higher surface potential. Since the second trace was biased at a relatively high 5 volts, white regions 760a and 760b reflect that the two extensions of the second trace have a relatively high voltage. Black regions 750a, 750b, and 750c reflect the relatively low surface potential (i.e., ground) of the extensions 700a, 700b, and 700c of the first trace. FIGS. 7a and 7b are printouts of a computer display. The full result of this experiment obtained respective topographical and surface potential values for each location.

The results of FIG. 7a and FIG. 7b were obtained simultaneously. The present invention enables such a simultaneous measurement because topography can be obtained from signal "b" at the same time as data (surface potential, charge density, and capacitance) is extracted from signals "c" and "d".

As apparent from FIG. 7a and FIG. 7b, the present invention enables the measurement of topographic and surface potential data with a spatial resolution in the order of nanometers. Therefore, by the above process and structure, the polarity and magnitude of surface potential $V_{dc,s}$ is determined with a precise spatial resolution.

6. Sample Surface Charge

If surface 170 of sample 112 has bound surface charge density "$\sigma_b$," such as occurs in a doped semiconductor surface, equation (4) is modified as described below. The electrostatic force $F_e$ is the sum of the electrostatic force resulting from the voltage imposed between conductive portion 164 of tip 132 ("capacitive force") and the electrostatic force resulting from the bound surface charge ("Coulomb force").

Since the probe tip-sample distance "m" is very small in contact mode operation, the electrical field $E_s$ induced by the bound surface charge density $\sigma_b$ is approximated as being uniform. In this approximation, the Coulomb force is expressed simply as $E_s q_1$, where $E_s = \sigma_b/2K_\epsilon$. "$E_s$" is an electric field due to a constant surface charge density $\sigma_b$, $q_1$ is a charge induced at tip 132 by the applied voltage $V_{ps}$, and $K_\epsilon$ is the dielectric constant of insulating portion 166.

Equation (17) defines the electrostatic force $F_e$ on tip 132 and is comparable to equation (4) except that Coulomb forces are considered in equation (53).

$$F_e = \frac{1}{2}\frac{dC}{dm}V_{ps}^2 + E_s q_1 \qquad (53)$$

Since $q_1 = CV_{ps}$ where "C" is the capacitance between tip 132 and sample 112 in the modeled parallel plate capacitor discussed above, and since $E_s = \sigma_b/2K_\epsilon$ equation (54) follows from equation (53).

$$F_e = \frac{1}{2}\frac{dC}{dm}V_{ps}^2 + \frac{\sigma_b C V_{ps}}{2K\varepsilon} \qquad (54)$$

For clarity, equation (1) is repeated as equation (55).

$$V_{ps} = V_{dc} + V_{ac}\cos\omega t \qquad (55)$$

Equation (56) is derived by substituting the value of the voltage between the tip 132 and sample 112 $V_{ps}$ from equation (55) into equation (54).

$$F_e = \frac{1}{2}\frac{dC}{dm}(V_{dc}+V_{ac}\cos\omega t)^2 + \frac{\sigma_b C}{2K\varepsilon}(V_{dc}+V_{ac}\cos\omega t) \tag{56}$$

Equation (57) is derived from equation (56) and reflects that $\cos^2\omega t$ is equal to $(1+\cos 2\omega t)/2$. Equation (57) is organized into dc, ω, and 2ω-components.

$$F_e = \left[\frac{1}{2}\frac{dC}{dm}\left(V_{dc}^2 + \frac{V_{ac}^2}{2}\right) + \frac{\sigma_b C}{2K\varepsilon}V_{dc}\right] + \left[\frac{dC}{dm}V_{dc} + \frac{\sigma_b C}{2K\varepsilon}\right]V_{ac}\cos\omega t + \frac{1}{4}\frac{dC}{dm}V_{ac}^2\cos 2\omega t \tag{57}$$

The dc voltage component $V_{dc}$ is set to zero so that the amplitude of the ω-component of the electrostatic force $F_{e,\omega}$ defined by equation (58).

$$F_{e,\omega} = V_{ac}\sigma_b C/2K_\varepsilon \tag{58}$$

Equation (59) is obtained by solving equation (58) for the surface charge density $\sigma_b$.

$$\sigma_b = 2K_\varepsilon F_{e,\omega}/CV_{ac} \tag{59}$$

For clarity, equation (32) defining capacitance is repeated below as equation (60).

$$C = K_\varepsilon(A/m) \tag{60}$$

Equation (61) is obtained by substituting the value of capacitance "C" from equation (60) into equation (59).

$$\sigma_b = 2mF_{e,\omega}/AV_{ac} \tag{61}$$

Equation (20) defines the amplitude of the ω-component of electrostatic force and, for clarity, is repeated below as equation (62).

$$F_{e,\omega} = (k_{ts,\omega}+k_1)\times(V_c/a_\omega) \tag{62}$$

Equation (63) is obtained by substituting value $F_{e,\omega}$ from equation (62) into equation (61).

$$\sigma_b = 2m(k_{ts,\omega}+k_1)V_c/AV_{ac}a_\omega \tag{63}$$

The voltage "$V_c$", the capacitive area "A", the amplitude of the ac voltage component $V_{ac}$, the cantilever 128 stiffness "$k_1$", and the transfer function "$a_\omega$" are all known. Therefore, assuming distance "m" and hardness $k_{ts,\omega}$ are known for a given location, the absolute value of the surface charge density $\sigma_b$ can be determined by monitoring signal "c" while keeping the amplitude of the ac voltage component $V_{ac}$ constant.

If distance "m" and hardness "$k_{ts,\omega}$" are constant, even if the values are not known, equation (63) indicates that the bound surface charge $\sigma_b$ is proportional to the voltage "$V_c$". Therefore, the relative magnitudes of surface charge density $\sigma_b$ can be obtained by monitoring signal "c" and keeping the amplitude of the ac voltage component "$V_{ac}$" constant.

In a second embodiment, the magnitude of the surface charge density $\sigma_b$ is determined by using feedback loop 158 as follows. The ω-component of equation (57) is equal to zero when equation (64) is true.

$$\left[\frac{dC}{dm}V_{dc} + \frac{\sigma_b C}{2K\varepsilon}\right] = 0 \tag{64}$$

Solving for the surface charge density $\sigma_b$ at which the ω-component will be equal to zero, equation (65) is obtained from equation (64).

$$\sigma_b = -2K_\varepsilon V_{dc}(dC/dm)/C \tag{65}$$

Capacitive gradient "dC/dm" and capacitance "C" are defined, respectively, by equation (14) and equation (22) and, for clarity, are respectively repeated below as equation (66) and equation (67).

$$dC/dm = 4(k_{ts,2\omega}+k_1)\times V_d/(a_{2\omega}\times V_{ac}^2) \tag{66}$$

$$C = K_\varepsilon(A/m) \tag{67}$$

The value of the capacitive gradient "dC/dm" from equation (66) and the value of the capacitance "C" from equation (67) are substituted into equation (65) to obtain equation (68).

$$\sigma_b = -8mV_{dc}(k_{ts,2\omega}+k_1)V_d/a_{2\omega}V_{ac}^2 A \tag{68}$$

The voltages "$V_{ac}$" and "$V_{dc}$", the capacitive area "A", the cantilever 128 stiffness "$k_1$", and the transfer function "$a_{2\omega}$" are all known and constant. Therefore, assuming that the distance "m" and the hardness $k_{ts,2\omega}$ are constant, the magnitude of the surface charge density is proportional to voltage "$V_d$". Therefore, signal "d" is monitored to determine the relative surface charge density $\sigma_b$ between locations. If distance "m" and hardness $k_{ts,2\omega}$ are known, then an absolute magnitude of the surface charge density $\sigma_b$ can be determined by measuring voltage "$V_d$" and using equation (68).

Figure 8:
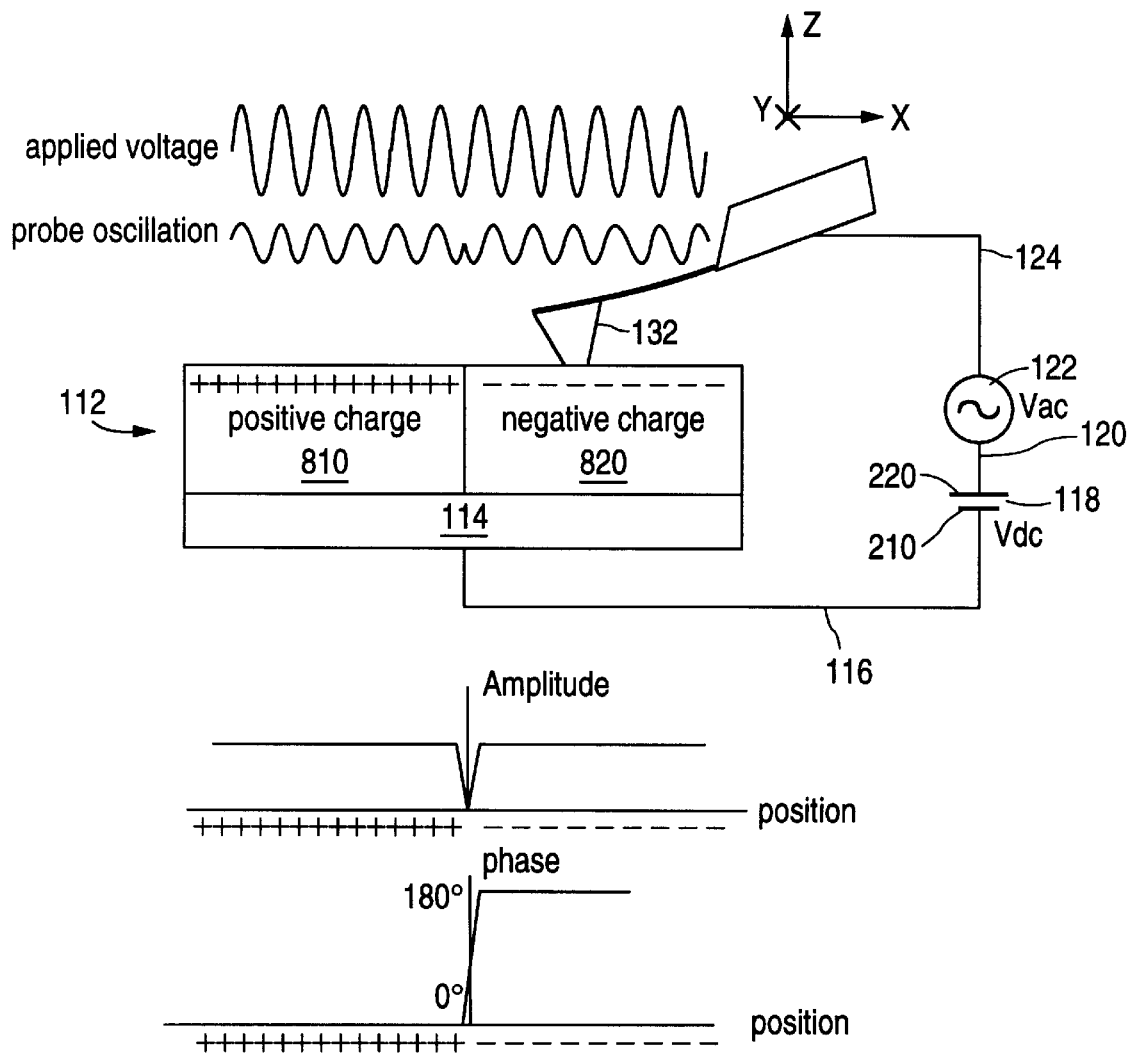
FIG. 8 is a diagram of the amplitude and phase of the ω-component as the tip of FIG. 1 passes over a positive and negative charged portion of a sample.

The process of determining the polarity of the surface charge density $\sigma_b$ is described with reference to FIG. 8. FIG. 8 is a diagram of the amplitude and phase of the ω-component as tip 132 passes over a positive and negative charged portion 810 and 820 of sample 112. In this figure, the dc voltage component is adjusted to zero. In positive charged region 810, the tip 132 vibration is "in phase" with the ac voltage component ($V_{ac}\cos\omega t$). In negative charged region 820, the probe vibration is "out of phase" with ac voltage component ($V_{ac}\cos\omega t$). Therefore, the polarity of the surface charge density $\sigma_b$ is determined by holding the dc voltage component $V_{dc}$ at ground and comparing the phase of signal "c" on ω-amplifier output line 156 to the phase of the ac voltage component $V_{ac}\cos\omega t$ as applied by ac voltage source 122.

Figure 9A:
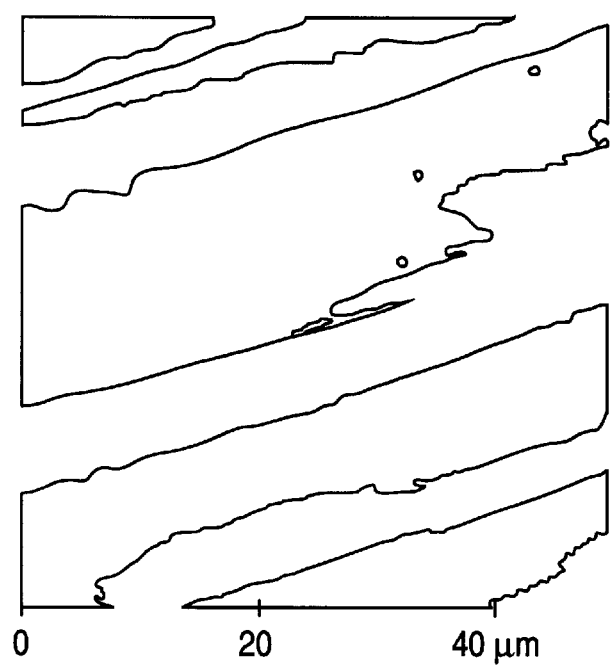
FIG. 9a and FIG. 9b show topographic (FIG. 9a) and charge density (FIG. 9b) images obtained simultaneously.
Figure 9B:
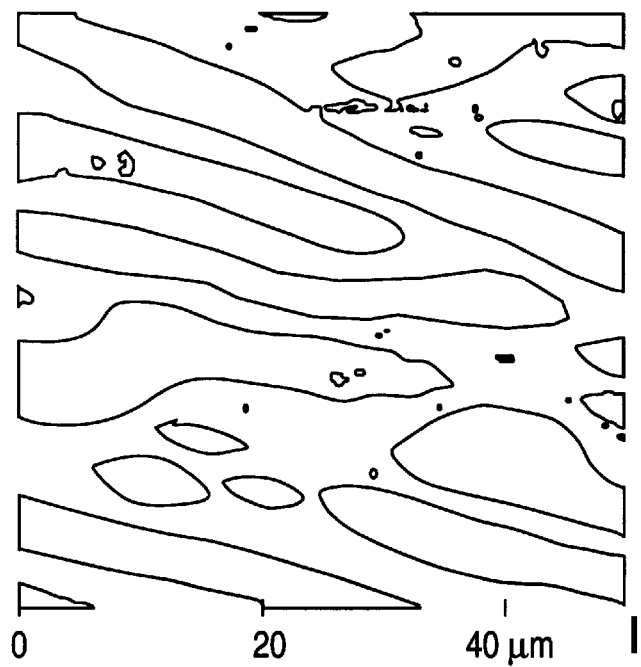

In FIG. 9a and FIG. 9b, examples of a topographic (FIG. 9a) and a charge density (FIG. 9b) image obtained simultaneously are shown. Again, spatial resolution is obtained in the order of nanometers. In this experiment, the sample was prepared by cleaving ferroelectric triglysine sulfate ("TGS") single crystals. There are two types of regions in the TGS sample, each having opposite polarization. These regions are called ferroelectric domains. The direction of the polarization in the TGS sample is vertical to the cleaved surface. Therefore each domain builds a layer of charge on its surface with either positive or negative polarity. In this measurement, the charge density image is independent of the topography image. The charge density image shows two distinct levels of black and white regions which have different polarity of the surface charge density with the same magnitude.

7. Sample Topography.

Signal "b" on scanner input line 150 acts as an input signal to scanner 152 to cause scanner 152 to position tip 132 such that the average of the tip-sample interactive force is constant. The vertical position of tip 132 follows the topography of surface 170 of sample 112 more precisely in EFMM than in the conventional noncontact mode microscopy. Thus, signal "b" is also used to map the high resolution topography of surface 170.

Advantages Over Existing Methods

In conventional Force Modulation Microscopy (FMM), either a sample or a probe cantilever is vibrated with a mechanical transducer. In either case, the mechanical transducer may excite other unwanted modes of vibration and introduce noise. In the case of EFMM, the electrostatic force $F_e$ vibrates only the probe against the sample and a clean vibration spectrum is obtained up to a much higher frequency range than in FMM.

In conventional EFM, the AFM is operated in noncontact mode, where the force gradient is used to control the tip-sample distance. Therefore, conventional EFM fails to follow the true topography of the sample where a large electrostatic force gradient is present. For example, abrupt changes in the surface potential or surface charge on the sample surface produce large electrostatic force gradients. In such cases, the AFM probe does not follow the true topography; but instead, follows the force gradient contour which includes the electrostatic force gradient as well as van der Waals force gradient. In other words, changes in surface potential or bound surface charge density produce errors in the topographical data. Such errors in topography cause successive measurement errors in measuring the electrical properties of the sample.

Figure 10A:
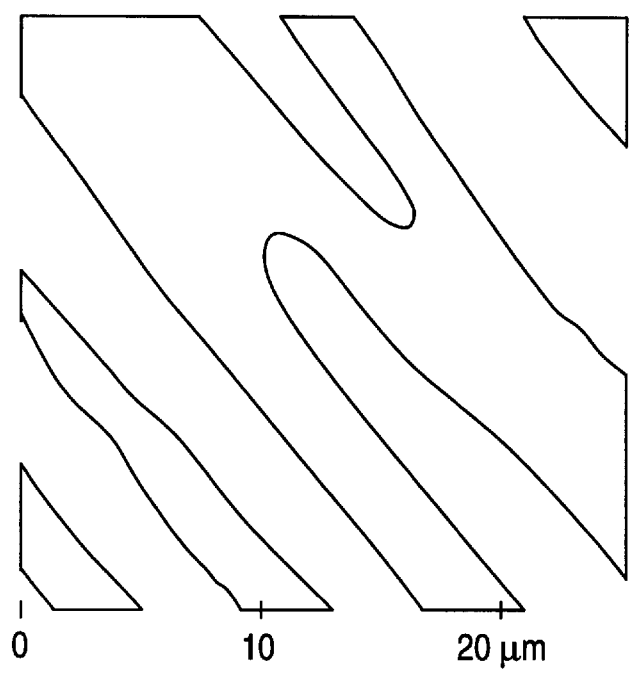
FIG. 10a and FIG. 10b are images in which a surface charge density image of a triglysine sulfate ("TGS") sample taken with EFMM (FIG. 10a) is compared with the one taken with normal EFM (FIG. 10b).
Figure 10B:
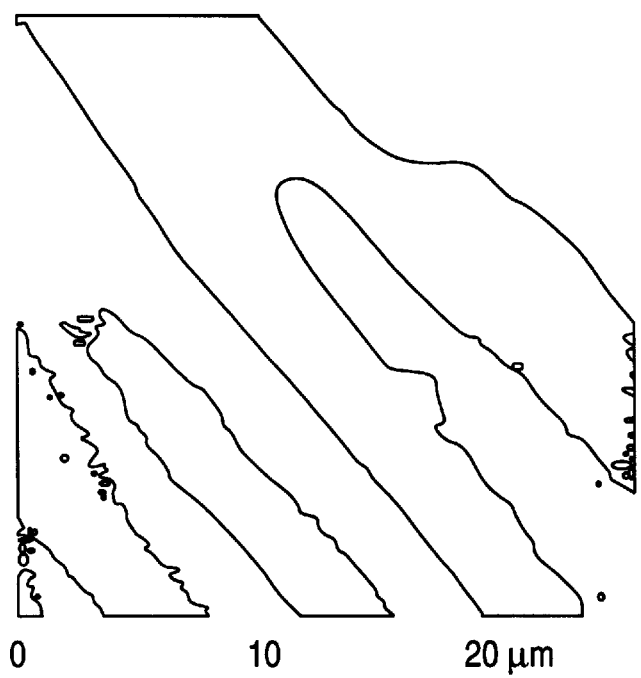

In EFMM, the probe tip is in contact with the sample surface, and therefore the tip accurately follows the topography of the sample. Since EFMM operates in contact mode, its operation is much simpler and its spatial resolution is significantly better than in noncontact mode EFM, where the tip is far away, approximately 10 nm, from the sample. An example is shown in FIG. 10a and FIG. 10b, where a surface charge density image of TGS sample taken with EFMM (FIG. 10a) is compared with the one taken with normal EFM (FIG. 10b). The EFMM image of FIG. 10a has a much better lateral resolution than the EFM image of FIG. 10b.

Another advantage of EFMM over EFM is that EFMM can use a much higher frequency. In EFMM, the probe tip is in contact with the sample and the mechanical resonance frequency of the probe is much higher than the probe of noncontact mode EFM, where the cantilever tip is free hanging. Therefore the probe can respond to much higher driving frequencies than in EFM, which is advantageous for frequency dependent measurements of electrical properties.

The above disclosure is illustrating only and not limiting. Further modifications will be apparent to one of ordinary skill in the art in light of this disclosure and the appended claims.

What we claim is:

1. A microscope arrangement comprising:
    a tip contacting a sample;
    an adjustable voltage source coupled to said tip for applying a voltage to said tip, wherein:
        said voltage has at least an alternating current (AC) component and generates an electrostatic force on said tip; and
        said tip mechanically deforms said sample primarily due to said electrostatic force; and
    a lock-in amplifier coupled to receive a signal from said tip.

2. The microscope arrangement of claim 1, wherein said signal is related to a position of said tip.

3. The microscope arrangement of claim 1, wherein said adjustable voltage source comprises a direct current voltage source, wherein said voltage also has a direct current component.

4. The microscope arrangement of claim 1, further comprising means for measuring a vibration of said tip relative to said sample.

5. The microscope arrangement of claim 1, further comprising:
    a cantilever supporting said tip at a free end of said cantilever; and
    a cantilever support supporting a fixed end of said cantilever.

6. The microscope arrangement of claim 5, further comprising:
    a reflector located on said cantilever;
    a source of electromagnetic propagation aimed at said reflector; and
    a detector of said electromagnetic propagation reflected from said reflector.

7. The microscope arrangement of claim 6, wherein said source of electromagnetic propagation comprises a laser source and wherein said detector comprises a laser detector.

8. The microscope arrangement of claim 1, further comprising a tip vibration detector for detecting a vibration of said tip.

9. The microscope arrangement of claim 8, wherein said vibration of said tip comprises a first component having a frequency approximately equal to said applied frequency.

10. The microscope arrangement of claim 9, where said vibration of said tip comprises a second component having a frequency approximately equal to twice said applied frequency.

11. The microscope arrangement of claim 10, further comprising means of detecting an amplitude and phase of said first and second components.

12. The microscope arrangement of claim 10, further comprising a second lock-in amplifier configured to isolate said second component.

13. The microscope arrangement of claim 10, further comprising a feedback loop coupled to said lock-in amplifier.

14. A microscope arrangement comprising:
    a tip contacting a sample;
    a voltage source coupled to said tip for applying a voltage between said tip and said sample, wherein said voltage has a direct current component and an alternating current component of an applied frequency and said voltage source comprises a direct current voltage source and an alternating current voltage source;
    a tip vibration detector for detecting a vibration of said tip, wherein said vibration of said tip comprises a component having a frequency approximately equal to said applied frequency;
    a lock-in amplifier configured to isolate said component; and
    a feedback loop coupled to said lock-in amplifier;
    wherein said direct current voltage source further comprises an adjustable direct current voltage source, and said feedback loop is coupled to said adjustable direct current voltage source.

15. The microscope arrangement of claim 14, further comprising a second lock-in amplifier coupled to receive a signal from said tip.

16. A method of observing a sample comprising:
maintaining a tip in contact with said sample;
while maintaining, applying a voltage between said tip and said sample to generate an electrostatic force wherein said voltage has at least an alternating current component;
mechanically deforming said sample primarily by application of said electrostatic force; and
measuring a signal related to deformation of said sample.

17. The method of claim 16, wherein said applying further comprises applying a direct current (DC) voltage to said tip relative to said sample.

18. The method of claim 17, further comprising during said maintaining, applying a fixed voltage to said sample.

19. The method of claim 18, wherein said applying a fixed voltage comprises grounding said sample.

20. The method of claim 16, further comprising measuring a vibration of said tip.

21. The method of claim 20, further comprising isolating a first component of said vibration having a frequency approximately equal to a frequency of said alternating current (AC) component.

22. The method of claim 21, further comprising isolating a second component of said vibration having a frequency approximately equal to twice said frequency of said alternating current (AC) component.

23. A microscope comprising:
a tip contacting a sample, said tip having a vibration;
a cantilever supporting said tip at a free end of said cantilever;
a cantilever support supporting a fixed end of said cantilever;
a reflector located on said cantilever;
a laser source aimed at said reflector;
a laser detector configured to receive laser light emitted from said laser source that reflect from said reflector;
a first voltage source coupled to said tip for applying a first voltage to said tip, said first voltage source comprising:
an alternating current voltage source for applying to said tip an alternating voltage having a frequency on said tip, said vibration having a first component having approximately said frequency and a second component having approximately twice said frequency; and
an adjustable direct current voltage source, wherein said first voltage has an ac component and a dc component;
a second voltage source for grounding said sample;
a first lock-in amplifier configured to isolate said first component;
a second lock-in amplifier configured to isolate said second component; and
a feedback loop coupled to said first lock-in amplifier and to said adjustable direct current voltage source.

24. A microscope arrangement comprising:
a tip contacting a sample;
an adjustable voltage source coupled to said tip for applying a voltage to said tip wherein said voltage has at least an alternating current (AC) component;
a feedback loop coupled to said adjustable voltage source; and
a lock-in amplifier coupled to receive a signal from said tip.

25. The microscope arrangement of claim 24, further comprising:
a cantilever supporting said tip at a free end of said cantilever;
a reflector located on said cantilever;
a laser source aimed at said reflector;
a laser detector configured to receive laser light emitted from said laser source that reflect from said reflector.

26. The microscope arrangement of claim 24, wherein said vibration comprises a second component having approximately twice said frequency.

27. The microscope arrangement of claim 24, wherein said first voltage has an AC component and a DC component.

28. The microscope arrangement of claim 24, further comprising a second voltage source for grounding said sample.

29. The microscope arrangement of claim 24, further comprising a second lock-in amplifier coupled to receive said signal from said tip.

30. The microscope arrangement of claim 24, wherein said adjustable voltage source includes a direct current voltage source and said feedback loop is coupled to said direct current voltage source by a switch.

31. The microscope arrangement of claim 24, wherein said signal is related to a position of said tip.

32. A method of observing a sample comprising:
maintaining a tip in contact with said sample;
while maintaining, applying a voltage between said tip and said sample to generate an electrostatic force that deforms said sample wherein said voltage has at least an alternating current component; and
while applying, measuring a signal related to the deformation due to said electrostatic force.

33. The method of claim 32, wherein local capacitance of said sample is determined from measurement of said signal from said tip.

34. The method of claim 32, wherein mechanical hardness of said sample is determined from measurement of said signal from said tip.

35. The method of claim 32, wherein a direct current (DC) component applied to said voltage is measured in determining surface potential of said sample.

36. The method of claim 32, wherein thickness of an insulating layer of said sample is determined from measurement of said signal from said tip.

37. The method of claim 32, where surface charge density of said sample is determined from measurement of said signal from said tip.

38. The method of claim 32, wherein said signal is related to a position of said tip.

39. A microscope arrangement comprising:
a non-piezoelectric sample;
a tip contacting said sample;
an alternating current voltage source coupled to said tip; and
a lock-in amplifier coupled to receive a signal from said tip.

40. The microscope arrangement of claim 39, further comprising a direct current voltage source coupled to said tip.

41. The microscope arrangement of claim 39, further comprising a second lock-in amplifier coupled to receive a signal from said tip.

42. The microscope arrangement of claim 41, further comprising a feedback loop coupled to said second lock-in amplifier.

43. The microscope arrangement of claim 39, wherein said signal is related to a position of said tip.

44. A method of measuring a property comprising:

providing a non-piezoelectric sample;

maintaining a tip in contact with said sample;

while maintaining, applying a voltage between said tip and said sample wherein said voltage has at least an alternating current component; and measuring a signal related to deformation of said sample.

45. The method of claim 44, wherein said signal is related to a position of said tip.

46. A method of observing a sample comprising:

maintaining a tip in contact with said sample;

while maintaining, applying a voltage between said tip and said sample wherein said voltage has at least an alternating current component;

while applying, measuring a signal from said tip; and charging said voltage based on said signal.

47. The method of claim 46, wherein said applying further comprises applying a direct current component.

48. The method of claim 46, wherein said measuring further comprises receiving said signal with a lock-in amplifier.

49. The method of claim 48, wherein said measuring further comprises receiving said signal with a feedback loop coupled to said lock-in amplifier.

50. The method of claim 46, wherein said signal is related to a position of said tip.

51. A microscope arrangement comprising:

a tip contacting a sample;

first means coupled to said tip for applying a voltage to said tip wherein said voltage has at least an alternating current (AC) component; and second means coupled to said tip for receiving a signal and amplifying a portion of said signal wherein said first means generates an electrostatic force on said tip to cause deformation of said sample.

52. The microscope arrangement of claim 51, further comprising a feedback means coupled to receive said signal from said second means and control said first means.

* * * * *